United States Patent
Stablo

(10) Patent No.: US 10,604,196 B2
(45) Date of Patent: Mar. 31, 2020

(54) SPOILER FOR MOTOR VEHICLE PROVIDED WITH A PASSIVE MOBILE ELEMENT

(71) Applicant: Compagnie Plastic Omnium, Lyons (FR)

(72) Inventor: Frédéric Stablo, Porcieu Amblagnieu (FR)

(73) Assignee: Compagnie Plastic Omnium (FR)

(*) Notice: Subject to any disclaimer, the term of this patent is extended or adjusted under 35 U.S.C. 154(b) by 21 days.

(21) Appl. No.: 16/066,977

(22) PCT Filed: Dec. 19, 2016

(86) PCT No.: PCT/FR2016/053543
§ 371 (c)(1),
(2) Date: Jun. 28, 2018

(87) PCT Pub. No.: WO2017/115029
PCT Pub. Date: Jul. 6, 2017

(65) Prior Publication Data
US 2019/0002036 A1 Jan. 3, 2019

(30) Foreign Application Priority Data
Dec. 30, 2015 (FR) .................................. 15 63472

(51) Int. Cl.
*B62D 35/00* (2006.01)
(52) U.S. Cl.
CPC ............. *B62D 35/007* (2013.01); *Y02T 10/82* (2013.01)

(58) Field of Classification Search
CPC .................................................... B62D 35/007
USPC ....................................................... 296/180.5
See application file for complete search history.

(56) References Cited

U.S. PATENT DOCUMENTS

| | | | |
|---|---|---|---|
| 2006/0043770 A1* | 3/2006 | Preiss | B62D 35/007 296/180.1 |
| 2016/0159412 A1* | 6/2016 | Oxley | B62D 35/007 296/180.5 |
| 2016/0221614 A1* | 8/2016 | Demange | B62D 35/007 |
| 2017/0002904 A1* | 1/2017 | Behle | F16H 7/02 |
| 2018/0134328 A1* | 5/2018 | Yoon | B62D 35/007 |
| 2018/0251166 A1* | 9/2018 | Escoffier | B62D 35/007 |
| 2019/0002036 A1* | 1/2019 | Stablo | B62D 35/007 |

(Continued)

FOREIGN PATENT DOCUMENTS

| | | |
|---|---|---|
| DE | 102014105513 A1 | 10/2015 |
| FR | 2816906 A1 | 5/2002 |
| FR | 2972994 A1 | 9/2012 |

*Primary Examiner* — Gregory A Blankenship
(74) *Attorney, Agent, or Firm* — St. Onge Steward Johnston & Reens, LLC

(57) ABSTRACT

The invention relates to a rear spoiler for a motor vehicle, intended for being arranged in a region of a rear edge of the roof above a rear window, said spoiler including a first portion provided with an upper surface substantially aligned with an imaginary extension of an air-flow line of the roof. The spoiler is characterised in that it includes a second portion, mounted movable relative to the first portion, between a retracted position (upstream) and an extended position (downstream), in which the spoiler portion projecting above the rear window is increased, and a passive movement system capable of moving the second portion as a function of the air flow on the upper surface of the spoiler.

21 Claims, 3 Drawing Sheets

(56) References Cited

U.S. PATENT DOCUMENTS

2019/0118873 A1* 4/2019 Posch .................... B62D 37/02
2019/0210666 A1* 7/2019 Wolf .................... B62D 35/007

* cited by examiner

SPOILER FOR MOTOR VEHICLE PROVIDED WITH A PASSIVE MOBILE ELEMENT

FIELD OF THE INVENTION

This invention relates to the field of motor vehicles. It concerns more particularly a rear spoiler of a motor vehicle.

A spoiler is a bodywork part designed to improve the aerodynamics of the vehicle to which this part is attached. Spoilers are also used for aesthetic aspects of the vehicle. The rear spoiler is attached to the rear of the vehicle. It is therefore a body part located and attached between the roof and the rear window. The spoiler can be attached, for example, in the upper and rear part of the vehicle, between the roof and the upper edge of the rear window, on the roof or on the tailgate.

BACKGROUND OF THE INVENTION

Rear spoilers fixedly mounted on a motor vehicle are known. One disadvantage of these spoilers is that it is not possible to improve the vehicle aerodynamics depending on the speed.

Thus, fixedly mounted rear spoilers have average overall efficiency (for each speed range). With these spoilers, the best efficiency for each speed range cannot be obtained.

Rear spoilers movably mounted on a motor vehicle are known. With this type of spoiler, however, the spoiler position can be adapted according to the speed range to obtain the best efficiency.

The position of this type of spoiler is changed by means of mechanical or hydraulic systems used to vary the spoiler position depending on the speed.

Thus, movably mounted rear spoilers are more efficient, but increase the weight of the vehicle, due to the actuation means required, and increase the energy consumption related to the operation of these actuation means.

SUMMARY OF THE INVENTION

The invention aims to overcome these disadvantages by proposing a spoiler with only one passively movable portion.

A passive movement is one that does not require an energy input dedicated to this movement function, in particular an input of electrical energy.

Thus, the invention relates to a rear spoiler for a motor vehicle, intended for being arranged in a region of a rear edge of the roof above a rear window. The spoiler includes a first portion provided with an upper surface substantially aligned with an imaginary extension of an air-flow line of the roof. The spoiler also includes a second portion, mounted movable relative to the first portion, between a retracted position and an extended position, in which the spoiler portion projecting above the rear window is increased. Lastly, the spoiler includes a passive movement system capable of moving the second portion as a function of the air flow on the upper surface of the spoiler.

Such a spoiler can adapt to the speed range, by changing its length, in order to improve the aerodynamics at the rear of the vehicle.

The spoiler may further comprise one or more of the following characteristics, taken alone or in combination:

- the passive movement system includes:
- at least one means for transmitting, on the second portion, the pressure generated by the air flow;
- at least one means for guiding the movement of the second portion; and
- at least one means for returning the second portion, to its retracted position;
- the upper surface of the spoiler includes at least one opening adapted to channel the air flow from the roof on at least one bearing surface of the second portion, so as to transmit on the second portion the pressure generated by the air flow, the opening and the bearing surface forming a transmission means;
- the second portion includes ribs capable of withstanding the forces related to the air flow from the roof on the bearing surface;
- the second portion is manufactured by internal foaming with a thickness capable of withstanding the forces related to the air flow from the roof on the bearing surface;
- the second portion includes a water evacuation system at the bottom of the bearing surface;
- the second portion is mounted movable relative to the first portion 40 on a portion of the spoiler by means of a sliding connection;
- the guide means is a sliding system including at least one slide by which the second portion slides, in one direction or the other, in the axis of the slide;
- the guide means includes Teflon-covered supports;
- the return means includes at least one elastic element, such as a spring;
- the first portion includes scraper type seals at its ends;
- the second portion is provided with an upper surface supporting the bearing surface and a movable wall downstream from the bearing surface;
- the movable wall is mounted movable relative to the second portion, so that it can passively open upwards, when the second portion is in the fully extended position or substantially close to this position;
- the movable wall is moved by passive actuation means such as a spring system;
- the movable wall is mounted movable in rotation about an axis oriented transversely relative to the vehicle when the spoiler is mounted on the vehicle;
- the spoiler includes several openings and several bearing surfaces;
- the first portion and/or the second portion are made of thermoplastic material.

BRIEF DESCRIPTION OF THE DRAWINGS

The invention will be better understood on reading the accompanying figures, which are given solely by way of example and not limiting in any way, in which.

DETAILED DESCRIPTION OF THE INVENTION

Figure 1:
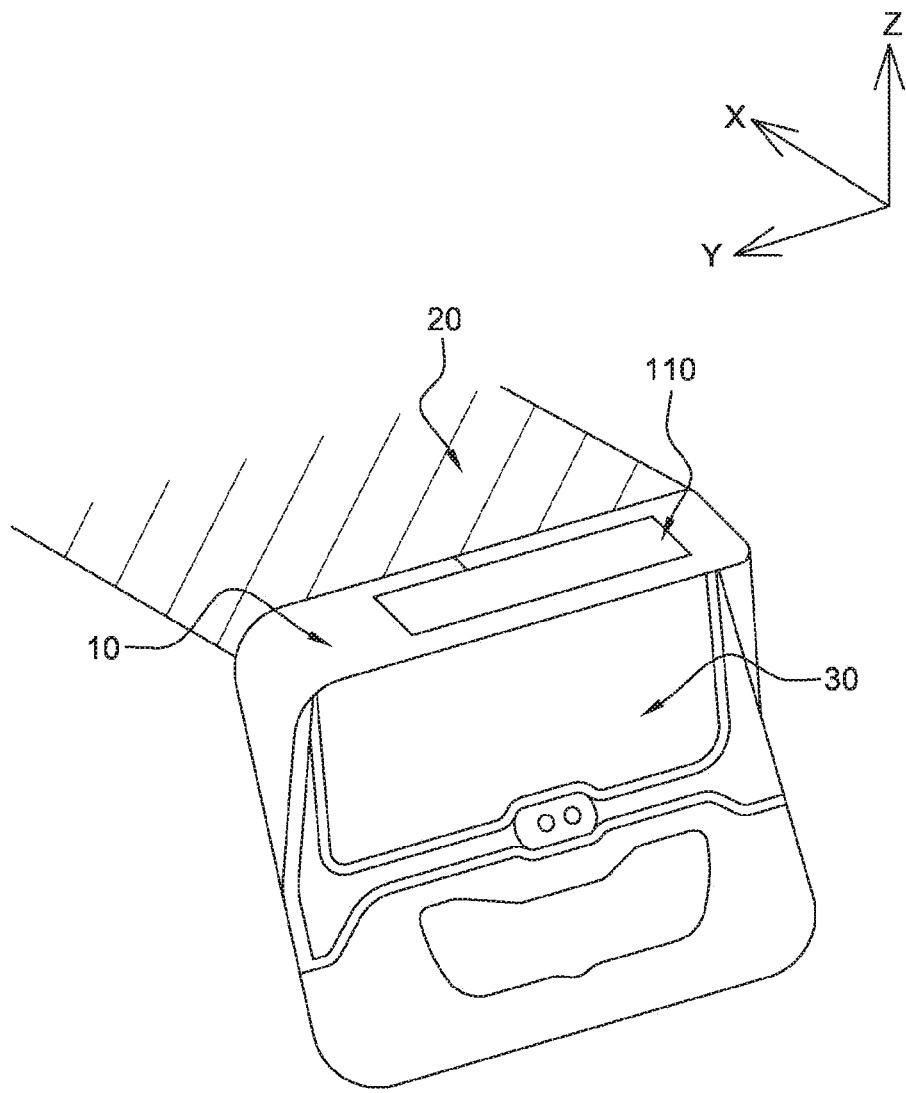
FIG. 1 illustrates a region of a rear edge of a motor vehicle roof provided with a spoiler.

FIG. 1 illustrates a spoiler 10 arranged in a region of a rear edge of the roof 20 above a rear window 30. The spoiler can thus be attached either to the roof, or carried on the tailgate.

We now refer to FIGS. 2A to 2C and 3A to 3C, which illustrate two embodiments of a spoiler 10 according to the invention.

The spoiler 10 includes a first portion 40 provided with an upper surface 45 substantially aligned with an imaginary extension of an air-flow line 50 of the roof 20, for aerodynamic and/or style reasons.

The first portion 40 includes an upstream portion, intended to be attached to the vehicle, and a downstream portion.

According to one embodiment, the downstream portion forms a projection above the rear window 30. The notions of upstream and downstream position refer to the air flow 50 on the upper surface 45 of the spoiler 10 when the vehicle is moving forwards.

The spoiler 10 also includes a second portion 60, mounted movable relative to the first portion 40, between a retracted position (upstream) and an extended position (downstream). The second portion 60 is mounted, in the retracted position, at least partially under the first portion 40. The second portion 60 is retractable under the first portion 40.

In the extended position, the second portion 60 is moved downstream in the direction of the air flow 50 on the upper surface 45 of the spoiler 10, so as to increase the length of the spoiler 10 towards the rear, in other words so as to increase the portion of spoiler projecting above the rear window 30. This is the position of the second portion 60 when the vehicle is moving at high speed (above 100 km/h). In other words, when the aerodynamic air flow (related to the movement of the vehicle) is high on the upper surface 45 of the spoiler 10.

In the retracted position, the second portion 60 is in an upstream position, as close as possible to the roof 20. This is the position of the second portion 60 at rest, in other words when the vehicle is stationary: there is no aerodynamic air flow (related to the movement of the vehicle) on the upper surface 45 of the spoiler 10.

The spoiler 10 includes a passive movement system 70 capable of moving the second portion 60 from its retracted position to its extended position, as a function of the air flow 50 on the upper surface 45 of the spoiler 10.

A passive movement is one that does not require an energy input dedicated to this function for moving the second portion 60, in particular an input of electrical energy.

The second portion 60 is manufactured so that it is stiff enough to withstand the aerodynamic pressure forces (lift coefficient Cz), which are approximately 10 to 20 daN.

Thus, the second portion 60 is preferably made with ribs, advantageously aesthetic, interlocking with the first portion 40.

The passive movement system 70 includes:
at least one means 80 for transmitting, on the second portion 60, the pressure generated by the air flow;
at least one means 90 for guiding the movement of the second portion 60; and
at least one means 100 for returning the second portion 60 to its retracted position.

The Transmission Means 80

The upper surface 45 of the spoiler 10 includes at least one opening 110 adapted to channel the air flow 50 from the roof on at least one bearing surface 120 of the second portion 60, so as to transmit on the second portion 60 the pressure generated by the air flow. Thus, the air flow 50 exerts a force on the bearing surface 120 capable of moving the second portion 60 towards its extended position.

The opening 110 and the bearing surface 120 thus form transmission means 80.

According to one embodiment, the upper surface 45 of the spoiler 10 includes a single opening 110 extending over substantially the entire width of the spoiler 10. The width of the spoiler is the dimension taken in the Y-axis of the vehicle, in other words across the width of the vehicle.

According to another embodiment, the upper surface 45 of the spoiler 10 includes several openings 110. According to this embodiment, the openings are preferably aligned on a transverse axis of the vehicle (in the Y-axis of the vehicle).

The second portion 60 then includes as many bearing surfaces 120 as there are openings 110. Each opening 110 then cooperates with one of the bearing surfaces 120.

The bearing surface 120 is an inclined surface which opposes the air flow 50. It is therefore oriented opposite the opening 110, and its downstream end is higher than its upstream end, as illustrates on FIGS. 2A to 2C.

Figure 2A:
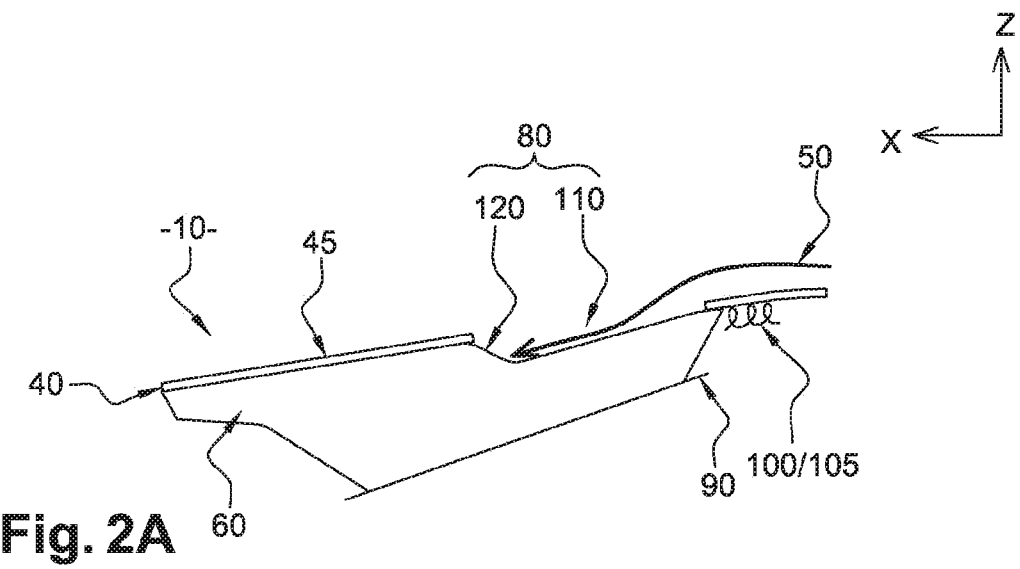
FIGS. 2A to 2C illustrate an embodiment of a spoiler according to the invention, and its operating mode.
Figure 2B:
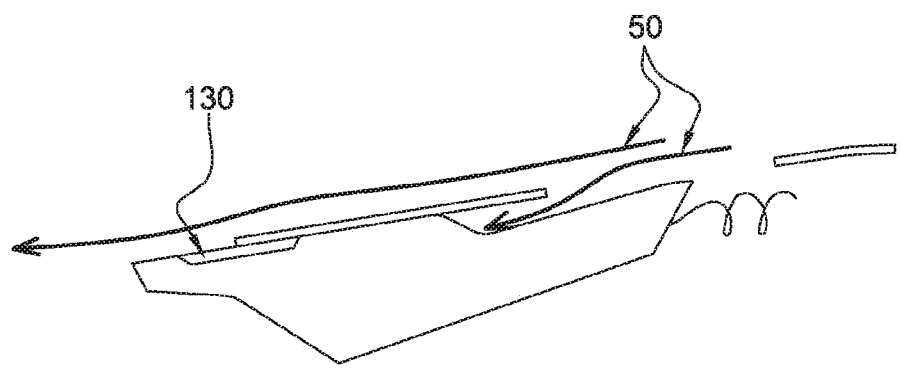
Figure 2C:
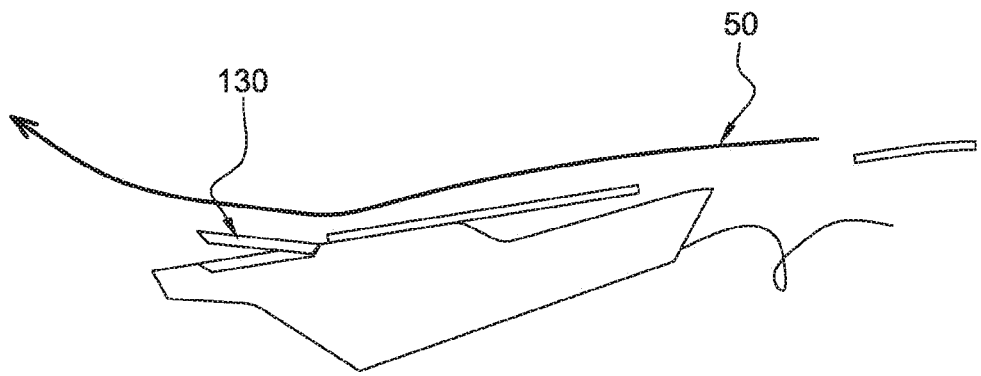
Figure 3A:
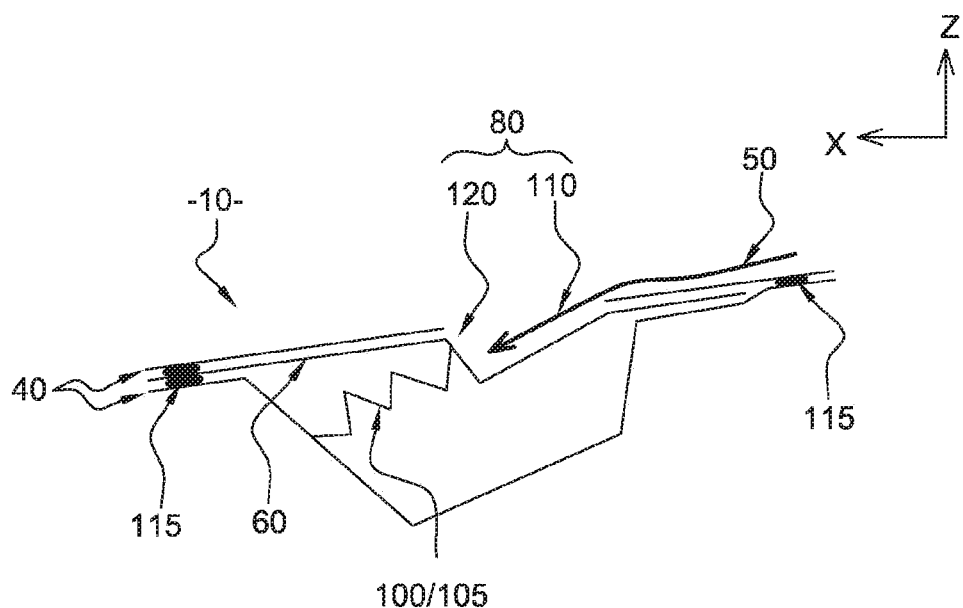
FIGS. 3A to 3C illustrate another embodiment of a spoiler according to the invention, and its operating mode.
Figure 3B:
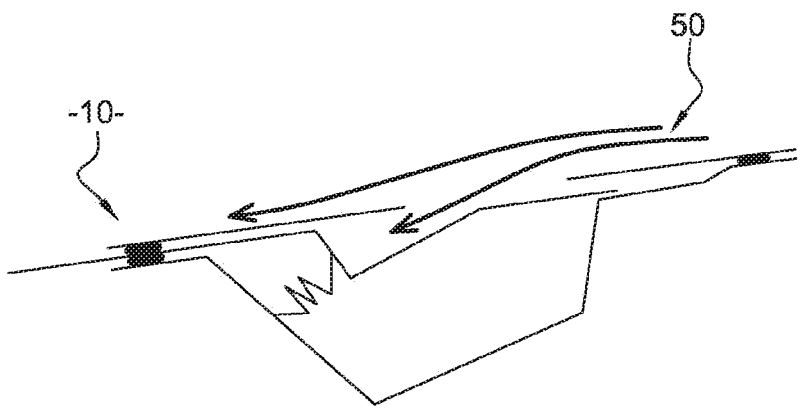
Figure 3C:
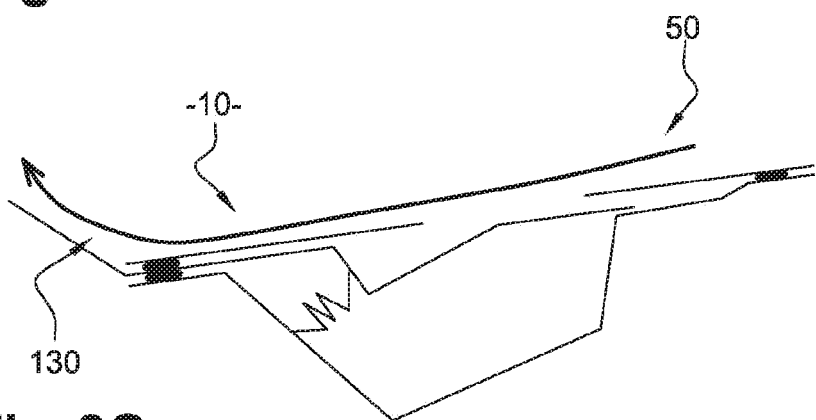

It is therefore understood that the higher the vehicle speed, the greater the force exerted by the air flow 50 on the bearing surface 120 and the more the second portion 60 moves downstream, towards its extended position (FIG. 2A, then FIG. 2B, then FIG. 2C). Thus, the higher the vehicle speed, the more the spoiler extends towards the rear (see FIG. 2C). The spoiler 10, now in the extended position, allows separation of the air flow and its reattachment more towards the rear of the vehicle.

Due to the use of this transmission means 80, the second portion 60 (movable) is manufactured so as to be lightweight and easily movable by the air pressure.

Consequently, the second portion 60 can also be manufactured by internal foaming with a thickness capable of providing sufficient inertia to withstand the aerodynamic pressure forces.

According to one embodiment, the second portion includes a water evacuation system at the bottom of the bearing surface 120. The V-shape of the portion 60 at this position may retain water, which it is preferable to evacuate.

The Guide Means 90

According to one embodiment (FIGS. 2A to 2C), the second portion 60 is mounted movable (relative to the first portion 40) on a portion of the spoiler, which may be the first portion 40, by means of at least one sliding connection. Such a connection allows the second portion 60 to move by translation.

The guide means 90 can therefore be a sliding system including at least one slide (not shown on the figures) by which the second portion 60 slides, in one direction or the other, in the axis of the slide.

To do this the second portion 60 includes a member 94 (not shown on the figures), such as a rib, cooperating with the slide in order to move along said slide.

To facilitate the movement by air, the guide means 90 advantageously includes supports covered with materials favoring sliding such as Teflon.

In order to preserve the sliding movement, the first portion 40 advantageously includes scraper type seals 115 at its ends, to prevent pollution from entering the guide means 90 between the two portions 40 and 60.

The Return Means 100

The return means 100 may include at least one elastic element 105 such as a spring. Preferably, the return means 100 includes several elastic elements 105. This spring 105 is attached firstly to a part of a fixed portion of the spoiler 10, for example the first portion 40, and secondly to the second portion 60.

According to one embodiment (FIGS. 2A to 2C), when the second portion 60 is in the retracted position, the spring 105 is in the rest position. Thus, we note that at rest, the second portion 60 is held in position by the spring 105, so that this portion 60 does not move. The spring is calibrated so that the portion 60 only moves above a given force, which depends in particular on the vehicle speed. Thus, it is the air flow 50 which makes the second portion 60 movable, by the air pressure on the bearing surface 120 which depends on the vehicle speed. For example, a spring having a stiffness constant of between 0.2 and 1 daN can be used. According to another embodiment (FIGS. 3A to 3C), the spring 105 is compressed when the second portion 60 moves from a retracted position towards an extended position.

It is therefore understood that the lower the vehicle speed, the lower the force exerted by the air flow 50 on the bearing surface 120, and the more the second portion 60 returns upstream (toward its retracted position) under the effect of the return force provided by the return means 100: the second portion 60 retracts towards its retracted position. Thus, the lower the vehicle speed, the shorter the spoiler 10.

The passive movement can take place continuously, in other words all the intermediate positions between the two extreme positions (retracted and extended) are possible. The movement is thus proportional to the force exerted by the air flow on the second portion 60.

The passive movement can take place discontinuously, in other words some intermediate positions between the two extreme positions (retracted and extended) are reached depending on thresholds: when the force exerted by the air flow 50 on the second portion 60 reaches a certain threshold, the second portion 60 moves a certain distance, corresponding, for example, to notches on the slide.

According to one embodiment, the second portion 60 is provided with an upper surface 65 supporting the bearing surface 120. Downstream from the bearing surface 120, the upper surface 65 supports a movable wall 130 (FIGS. 2B, 2C).

This movable wall 130 is mounted movable relative to the second portion 60, so that it can passively open upwards (FIG. 2C), when the second portion 60 is in the fully extended position or substantially close to this position. This movable wall then plays a second aerodynamic role by allowing the lift to increase or the air flow 50 to separate.

This movable wall 130 is configured to be flush (neither above nor below) with the upper surface 65, in the closed position, as illustrated on FIG. 2B.

The movable wall 130 is moved by passive actuation means 140 (not shown) such as a spring system. In such a system, the springs are compressed when the movable wall 130 is in the closed position, under the first portion 40 of the spoiler 10. When the movable wall 130 is released from below the first portion 40 of the spoiler 10, then the springs extend into the rest position.

Obviously, the return means 100 exerts a return force on the second portion 60 strong enough to compress the springs of the actuation means 140. When the vehicle slows down, therefore, the second portion 60 returns towards its retracted position while closing the movable wall 130.

According to the example of FIG. 2C, the movable wall 130 is mounted movable in rotation about an axis 140 oriented transversely relative to the vehicle.

Advantageously, the first portion 40 and/or the second portion 60 are made of thermoplastic material.

Advantageously, the second portion 60 is made of a material lighter than the first portion.

The invention is not limited to the embodiments described and other embodiments will be clearly apparent to those skilled in the art. In particular, according to one embodiment, the downstream portion of the second portion 60 could form a projection above the rear window 30.

What is claimed is:

1. A rear spoiler for a motor vehicle, intended for being arranged in a region of a rear edge of a roof above a rear window, said rear spoiler comprising a first portion provided with an upper surface substantially aligned with an imaginary extension of an air-flow line of the roof, wherein the rear spoiler includes a second portion, mounted movable relative to the first portion, between a retracted position which is upstream and an extended position which is downstream, in which a spoiler portion projects above the rear window is increased, and a passive movement system capable of moving the second portion as a function of the air flow on the upper surface of the spoiler.

2. The spoiler according to claim 1, comprising a passive movement system including:
   at least one transmission, on the second portion, which transmits a pressure generated by the air flow;
   at least one guide which guides the movement of the second portion; and
   at least one return element which returns the second portion to its retracted position.

3. The spoiler according to claim 2, wherein the upper surface of the spoiler includes at least one opening adapted to channel the air flow from the roof of the motor vehicle on at least one bearing surface of the second portion, so as to transmit on the second portion the pressure generated by the air flow, the opening and the bearing surface forming the transmission.

4. The spoiler according to claim 3, wherein the second portion includes ribs capable of withstanding forces related to the air flow from the roof on the bearing surface.

5. The spoiler according to claim 3, wherein the second portion includes ribs capable of withstanding forces related to the air flow from the roof on the bearing surface and the second portion is manufactured by internal foaming with a thickness capable of withstanding the forces related to the air flow from the roof on the bearing surface.

6. The spoiler according to claim 3, wherein the second portion includes a water evacuation system at a bottom of the bearing surface.

7. The spoiler according to claim 2, wherein the second portion is mounted movable relative to the first portion on a portion of the spoiler by a sliding connection.

8. The spoiler according to claim 7, wherein the guide is a sliding system including at least one slide by which the second portion slides, in one direction or the other, in an axis of the slide.

9. The spoiler according to claim 8, wherein the guide includes polytetrafluoroethylene covered supports.

10. The spoiler according to claim 2, wherein the return element includes at least one elastic element.

11. The spoiler according to claim 1, wherein the first portion includes scraper type seals at its ends.

12. The spoiler according to claim 1, wherein the second portion is provided with an upper surface supporting a bearing surface and a movable wall downstream from the bearing surface.

13. The spoiler according to claim 12, wherein the movable wall is mounted movable relative to the second portion, so that the movable wall can passively open upwards, when the second portion is at or substantially close to a fully extended position.

14. The spoiler according to claim 13, wherein the movable wall is moved by passive actuation.

15. The spoiler according to claim 12, wherein the movable wall is mounted movable in rotation about an axis oriented transversely relative to the vehicle when the spoiler is mounted on the vehicle.

16. The spoiler according to claim 1, including several openings and several bearing surfaces.

17. The spoiler according to claim 1, wherein the first portion or the second portion or the first portion and the second portion are made of thermoplastic material.

18. The spoiler according to claim 10 wherein the elastic element is a spring.

19. The spoiler according to claim 14 wherein the passive actuation is a spring.

20. The spoiler according to claim 13, wherein the movable wall is mounted movable in rotation about an axis oriented transversely relative to the vehicle when the spoiler is mounted on the vehicle.

21. The spoiler according to claim 14, wherein the movable wall is mounted movable in rotation about an axis oriented transversely relative to the vehicle when the spoiler is mounted on the vehicle.

* * * * *

UNITED STATES PATENT AND TRADEMARK OFFICE
CERTIFICATE OF CORRECTION

PATENT NO. : 10,604,196 B2
APPLICATION NO. : 16/066977
DATED : March 31, 2020
INVENTOR(S) : Frédéric Stablo Page 1 of 1

It is certified that error appears in the above-identified patent and that said Letters Patent is hereby corrected as shown below:

On the Title Page

Item (71), Line 1:
"Compagnie Plastic Omnium, Lyons"
Should be changed to:
-- Compagnie Plastic Omnium, Lyon --

Signed and Sealed this
Twenty-sixth Day of May, 2020

Andrei Iancu
*Director of the United States Patent and Trademark Office*